(12) United States Patent
Ash et al.

(10) Patent No.: US 10,733,473 B2
(45) Date of Patent: Aug. 4, 2020

(54) OBJECT VERIFICATION FOR A NETWORK-BASED SERVICE

(71) Applicant: Uber Technologies, Inc., San Francisco, CA (US)

(72) Inventors: Richard Ash, San Francisco, CA (US); Lenny Evans, San Francisco, CA (US); Derrick Ongchin, San Mateo, CA (US)

(73) Assignee: Uber Technologies Inc., San Francisco, CA (US)

( * ) Notice: Subject to any disclaimer, the term of this patent is extended or adjusted under 35 U.S.C. 154(b) by 100 days.

(21) Appl. No.: 16/136,946

(22) Filed: Sep. 20, 2018

(65) Prior Publication Data

US 2020/0097753 A1 Mar. 26, 2020

(51) Int. Cl.
| | |
|---|---|
| *G06K 9/46* | (2006.01) |
| *G06K 9/20* | (2006.01) |
| *G06F 3/0481* | (2013.01) |
| *G06K 9/00* | (2006.01) |
| *G06N 20/00* | (2019.01) |
| *G06F 16/435* | (2019.01) |

(52) U.S. Cl.
CPC ....... *G06K 9/4661* (2013.01); *G06F 3/04812* (2013.01); *G06F 16/435* (2019.01); *G06K 9/00201* (2013.01); *G06K 9/2027* (2013.01); *G06K 9/2036* (2013.01); *G06N 20/00* (2019.01)

(58) Field of Classification Search
CPC ............... G06K 9/4661; G06K 9/2027; G06K 9/00201; G06K 9/2036; G06F 16/435; G06F 3/04812; G06N 20/00

USPC .......................................................... 382/170
See application file for complete search history.

(56) References Cited

U.S. PATENT DOCUMENTS

| | | | |
|---|---|---|---|
| 4,412,175 A | 10/1983 | Maynarez |
| 4,663,744 A | 5/1987 | Russell |
| 5,400,348 A | 3/1995 | Yang |
| 6,828,692 B2 | 12/2004 | Simon |
| 7,359,773 B2 | 4/2008 | Simon |
| 7,979,899 B2 | 7/2011 | Guo |
| 8,082,587 B2 | 12/2011 | Bolay |
| 8,131,848 B1 | 3/2012 | Denise |

(Continued)

FOREIGN PATENT DOCUMENTS

| | | |
|---|---|---|
| CN | 103426016 | 12/2013 |
| EP | 2333582 | 6/2011 |

(Continued)

OTHER PUBLICATIONS

ISR and Written Opinion in PCT/US2019/055415 dated Feb. 4, 2020.

(Continued)

*Primary Examiner* — Jerome Grant, II
(74) *Attorney, Agent, or Firm* — Mahamedi IP Law LLP

(57) ABSTRACT

A mobile computing device can capture a plurality of images of an object to be verified using a camera of the mobile computing device. A first image of the plurality of images is captured while a flash of the mobile computing device is deactivated and a second of the plurality of images is captured while the flash is activated. The verification data can include a first set of verification metrics, which is representative of the light reflectivity of the object, and can be generated by the mobile computing device or a network service by analyzing the first and second images.

17 Claims, 8 Drawing Sheets

(56) References Cited

U.S. PATENT DOCUMENTS

| | | |
|---|---|---|
| 8,205,790 B2 | 6/2012 | Pennella |
| 8,312,543 B1 | 11/2012 | Gardner |
| 8,359,225 B1 | 1/2013 | Seth |
| 8,458,041 B1 | 6/2013 | Jakobsson |
| 8,538,158 B1 | 9/2013 | Denise |
| 8,555,379 B1 | 10/2013 | Whitehouse |
| 8,671,449 B1 | 3/2014 | Nachenberg |
| 9,003,505 B2 | 4/2015 | Brown |
| 9,037,864 B1 | 5/2015 | Staddon |
| 9,043,970 B1 | 6/2015 | Desbons |
| 9,300,676 B2 | 3/2016 | Madhu |
| 9,424,612 B1 | 8/2016 | Bright |
| 9,491,155 B1 | 11/2016 | Johansson |
| 9,552,569 B1 | 1/2017 | Quan |
| 9,799,067 B2 * | 10/2017 | Hasson .................. G06Q 20/20 |
| 9,824,222 B1 | 11/2017 | Kaplan |
| 9,967,750 B1 | 5/2018 | Fernandez |
| 10,243,945 B1 | 3/2019 | Kruse |
| 10,263,868 B1 | 4/2019 | Baldi |
| 2002/0196415 A1 | 12/2002 | Shiratani |
| 2004/0030932 A1 | 2/2004 | Juels |
| 2004/0225520 A1 | 11/2004 | Aoki et al. |
| 2004/0249818 A1 | 12/2004 | Isaac |
| 2005/0278192 A1 | 12/2005 | Cantini et al. |
| 2006/0149967 A1 | 7/2006 | Lee |
| 2006/0206709 A1 | 9/2006 | Labrou |
| 2007/0033493 A1 | 2/2007 | Flake |
| 2008/0195428 A1 | 8/2008 | O'Sullivan |
| 2008/0313723 A1 | 12/2008 | Naono |
| 2009/0111491 A1 | 4/2009 | Lemberg |
| 2009/0157490 A1 | 6/2009 | Lawyer |
| 2009/0248587 A1 | 10/2009 | Van Buskirk |
| 2009/0265198 A1 | 10/2009 | Lester |
| 2009/0300744 A1 | 12/2009 | Guo |
| 2010/0131589 A1 | 5/2010 | Lawyer |
| 2010/0211498 A1 | 8/2010 | Aabye et al. |
| 2010/0273445 A1 | 10/2010 | Dunn |
| 2010/0274691 A1 | 10/2010 | Hammad |
| 2010/0293094 A1 | 11/2010 | Kolkowitz |
| 2010/0306834 A1 | 12/2010 | Grandison |
| 2010/0332400 A1 | 12/2010 | Etchegoyen |
| 2011/0023101 A1 | 1/2011 | Vernal |
| 2011/0145137 A1 | 6/2011 | Driemeyer |
| 2011/0202466 A1 | 8/2011 | Carter |
| 2011/0251951 A1 | 10/2011 | Kolkowitz et al. |
| 2011/0314548 A1 | 12/2011 | Yoo |
| 2012/0040692 A1 | 2/2012 | Baba |
| 2012/0072384 A1 | 3/2012 | Schreiner |
| 2012/0149049 A1 | 6/2012 | Torres |
| 2012/0209970 A1 | 8/2012 | Scipioni |
| 2012/0246720 A1 | 9/2012 | Xie |
| 2012/0292388 A1 * | 11/2012 | Hernandez .......... G06Q 20/108 |
| | | 235/379 |
| 2012/0309539 A1 | 12/2012 | Smith |
| 2012/0311036 A1 | 12/2012 | Huhn |
| 2013/0018795 A1 | 1/2013 | Kolhatkar et al. |
| 2013/0086169 A1 | 4/2013 | Bruich |
| 2013/0090086 A1 | 4/2013 | Lopez |
| 2013/0132547 A1 | 5/2013 | Reed |
| 2013/0139236 A1 | 5/2013 | Rubinstein |
| 2013/0159195 A1 | 6/2013 | Kirillin |
| 2013/0172085 A1 | 7/2013 | Harrington |
| 2013/0185791 A1 | 7/2013 | Xie |
| 2013/0214898 A1 | 8/2013 | Pineau |
| 2013/0214902 A1 | 8/2013 | Pineau |
| 2013/0232549 A1 | 9/2013 | Hawkes |
| 2013/0282504 A1 | 10/2013 | Lessin |
| 2013/0282810 A1 | 10/2013 | Lessin |
| 2013/0282812 A1 | 10/2013 | Lessin |
| 2013/0298192 A1 | 11/2013 | Kumar |
| 2013/0340052 A1 | 12/2013 | Jakobsson |
| 2014/0013107 A1 | 1/2014 | Clair |
| 2014/0032406 A1 * | 1/2014 | Roach .................. G06Q 20/042 |
| | | 705/42 |
| 2014/0037184 A1 | 2/2014 | Gorski |
| 2014/0122216 A1 * | 5/2014 | Hasson .................. G06Q 20/20 |
| | | 705/14.38 |
| 2014/0129420 A1 | 5/2014 | Howe |
| 2014/0179434 A1 | 6/2014 | Xu |
| 2014/0196110 A1 | 7/2014 | Rubinstein |
| 2014/0196159 A1 | 7/2014 | Mangalam-Palli |
| 2014/0230026 A1 | 8/2014 | Forero |
| 2014/0237570 A1 | 8/2014 | Shishkov |
| 2014/0270411 A1 | 9/2014 | Shu |
| 2014/0280568 A1 | 9/2014 | Postrel |
| 2014/0282977 A1 | 9/2014 | Madhu |
| 2015/0065166 A1 | 3/2015 | Ward |
| 2015/0089514 A1 | 3/2015 | Grewal |
| 2015/0095235 A1 | 4/2015 | Dua |
| 2015/0106900 A1 | 4/2015 | Pinski |
| 2015/0113622 A1 | 4/2015 | Dua |
| 2015/0142595 A1 | 5/2015 | Acuna-Rohter |
| 2015/0163217 A1 | 6/2015 | Lo |
| 2015/0172277 A1 | 6/2015 | Hoggan |
| 2015/0186492 A1 | 7/2015 | Shalita |
| 2015/0189026 A1 | 7/2015 | Cohen |
| 2015/0222619 A1 | 8/2015 | Hughes |
| 2015/0278692 A1 | 10/2015 | Milewski |
| 2015/0304268 A1 | 10/2015 | Byttow |
| 2015/0319199 A1 | 11/2015 | Yanashima |
| 2015/0347591 A1 | 12/2015 | Bax |
| 2015/0381668 A1 | 12/2015 | Kurabayashi |
| 2016/0006717 A1 | 1/2016 | Ji |
| 2016/0014457 A1 | 1/2016 | Dua |
| 2016/0048831 A1 | 2/2016 | Ongchin |
| 2016/0048837 A1 * | 2/2016 | Jin ....................... G06Q 20/409 |
| | | 705/76 |
| 2016/0057154 A1 | 2/2016 | Ferguson |
| 2016/0078706 A1 * | 3/2016 | Pawlik ..................... G07D 7/12 |
| | | 348/135 |
| 2016/0219046 A1 | 7/2016 | Ballard |
| 2016/0292679 A1 | 10/2016 | Kolin |
| 2016/0300185 A1 | 10/2016 | Zamer |
| 2016/0366168 A1 | 12/2016 | Cazin |
| 2017/0039567 A1 * | 2/2017 | Stern .................. G06Q 20/409 |
| 2017/0039890 A1 | 2/2017 | Truong |
| 2017/0075894 A1 | 3/2017 | Poornachandran |
| 2017/0111364 A1 | 4/2017 | Rawat |
| 2017/0236411 A1 | 8/2017 | Sumers |
| 2017/0309552 A1 | 10/2017 | Singleton |
| 2018/0310135 A1 | 10/2018 | Cirit |
| 2019/0102873 A1 | 4/2019 | Wang |
| 2019/0228111 A1 * | 7/2019 | Aliakseyeu ............. G06F 30/00 |
| 2020/0051059 A1 * | 2/2020 | Filler .................. G06Q 20/3274 |

FOREIGN PATENT DOCUMENTS

| | | | | |
|---|---|---|---|---|
| JP | 2014 216736 | * | 11/2014 | ............ H04W 76/02 |
| KR | 10-2007-0054784 | | 5/2007 | |
| TW | M569886 | * | 11/2018 | ............... G06K 9/00 |
| WO | WO 2017/083841 | | 5/2017 | |
| WO | WO 2017/0114125 | | 7/2017 | |

OTHER PUBLICATIONS

"Advanced Technologies for Detecting and Preventing Fraud at Uber", Jun. 14, 2018 [Retrieved on Jan. 29, 2020 from https://eng.uber.com/advanced-technologies-detecting-preventing- fraud-uber/].

Zhao B. and Chen, Q., "Location Spoofing in a Location-Based Game: A Case Study of Pokemon Go." International Cartographic Conference, May 31, 2017, pp. 21-32 (Abstract Only).

WRO in PCT/US2019/051334 dated Dec. 18, 2019.

International Search Report in related PCT/US2015/045325 dated Nov. 25, 2015.

Ghazizadeh, "Reputation Model for B2C E-commerce: A Trust Flow Based on Social Networks", 2011 International Conference on Research and Innovation in Information Systems (ICRIIS), Nov. 23-24, 2011, 6 pages.

Wilson, "Beyond Social Graphs: User Interactions in Online Social Networks and their Implications", ACM Transactions on the Web, vol. 6, No. 4, article 17, Nov. 2012, 31 pages.

(56) References Cited

OTHER PUBLICATIONS

Chard, "A Social Content Delivery Network for Scientific Cooperation: Vision, Design, and Architecture", 2012 SC Companion: High Performance Computing, Networking, Storage and Analysis (SCC), Nov. 10-16, 2012, 10 pages.

Nagy, "PeerShare: A System Secure Distribution of Sensitive Data Among Social Contacts", NordSec Proceedings of the 18th Nordic Conference on Secure IT Systems—vol. 8202, Oct. 18-21, 2013, pp. 154-165.

Agarwal, "Detecting Malicous Activies using Backward Propagation of Trustworthiness over Heterogeneous Social Graph", 2013 IEEE/WIC/ ACM International Conferences on Web Intelligence (WI) and Intelligent Agent Technology (IAT), 2013, pp. 290-291.

CSC Leading Edge Forum, "Data rEvolution", 2011, 68 pages.

Kirschner, "Implementing social network analysis for fraud prevention", CGI Group Ind. (2011).

Gondor, Sebastien, "Sonic: Towards seamless interaction in heterogeneous distributed OSN ecosystems", Wireless andn Mobile Computing, Network and Communications (WiMob), 2014 IEEE 10th International Converence on, IEEE 2014.

Lima, "Fraud Detection in web transactions", Proceedings of the 18th Brazilian symposium on Multimedia and the web. ACM 2012.

Bonneau, "The privacy jungle: On the market for data protection in social networks", Economics of information, security and privacy, Springer, Boston MA 2010.

Dhivya, "Averting Intruder Attach on Social Network by Data Sanitization", International Journel of Computer Science and Engineering 4.2 (2016).

Boshmaf, Security analysis of malicious socialbots on the web. Diss. University of British Columbia, 2015.

EESR dated Dec. 8, 2017 in EP 15832658.7.

White, "How Computers Work", Oct. 15, 2003, Paul Boger, Illustrated by Timothy Edward.

\* cited by examiner

460

Convert 1st and 2nd Images to Greyscale
465

↓

Align Images
470

↓

Generate Pixel Map
(Pixel Value Deltas Between 1st & 2nd Imgs.)
475

↓

Compute Measure of Light Reflectivity Intensity
480

↓

Compute Measure of Light Reflectivity Pattern
485

FIG. 4B

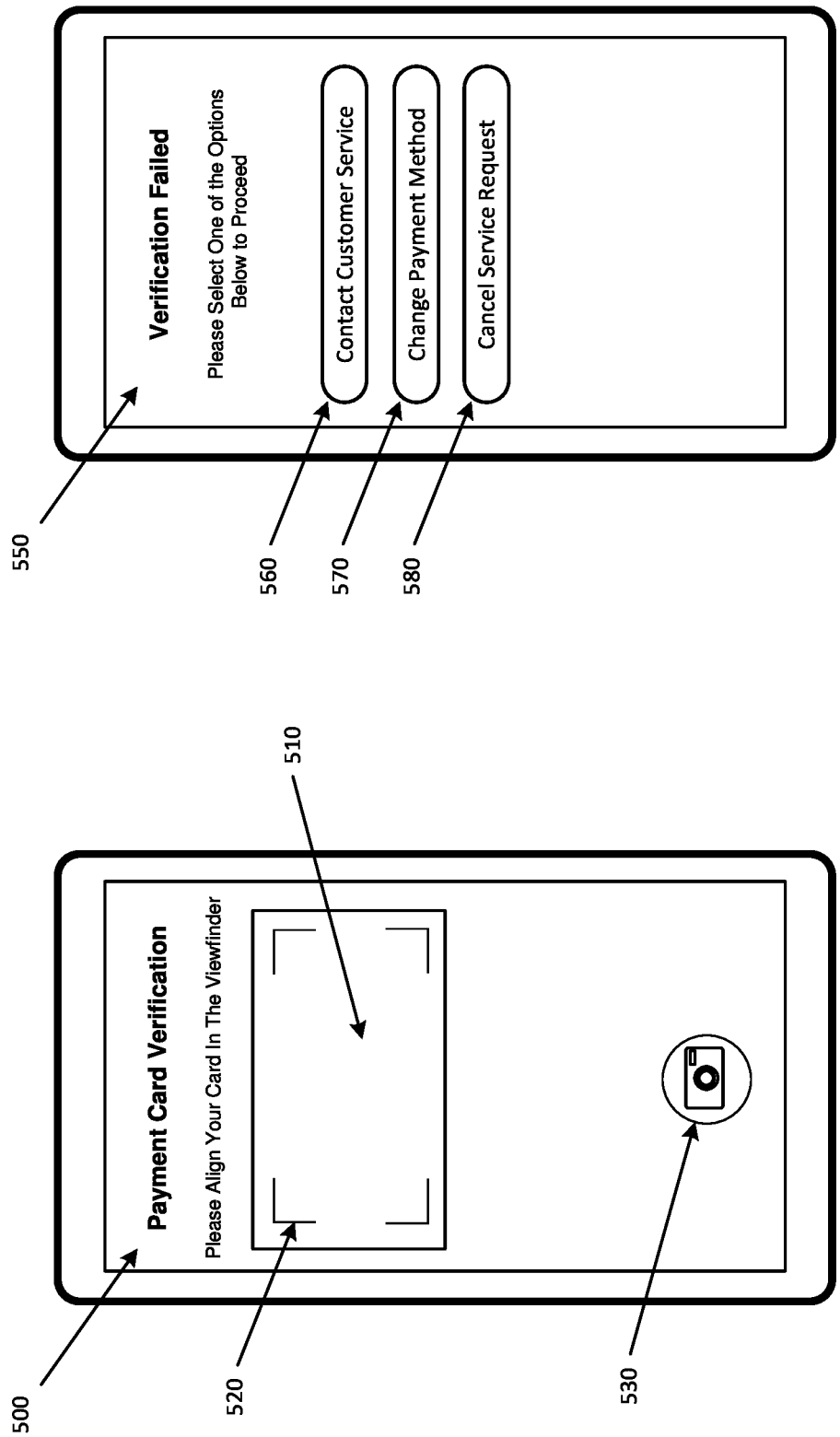

OBJECT VERIFICATION FOR A NETWORK-BASED SERVICE

BACKGROUND

A network-based service can connect users with available service providers who can provide the requested service for the users. A given user of the network-based service can be prompted to demonstrate that he or she has physical possession of an object (e.g., a payment card) before being able to request the network-based service. Conventional object-verification methods simply prompt the user to capture an image of the object to demonstrate that he or she has physical possession of the object.

BRIEF DESCRIPTION OF THE DRAWINGS

The disclosure herein is illustrated by way of example, and not by way of limitation, in the figures of the accompanying drawings in which like reference numerals refer to similar elements, and in which:

FIG. 4B is a flowchart illustrating an example method of performing light reflectivity analysis, in accordance with examples described herein;

FIGS. 5A and 5B illustrate example user interfaces displayed on a user device for performing object verification, in accordance with examples described herein;

DETAILED DESCRIPTION

Figure 1:
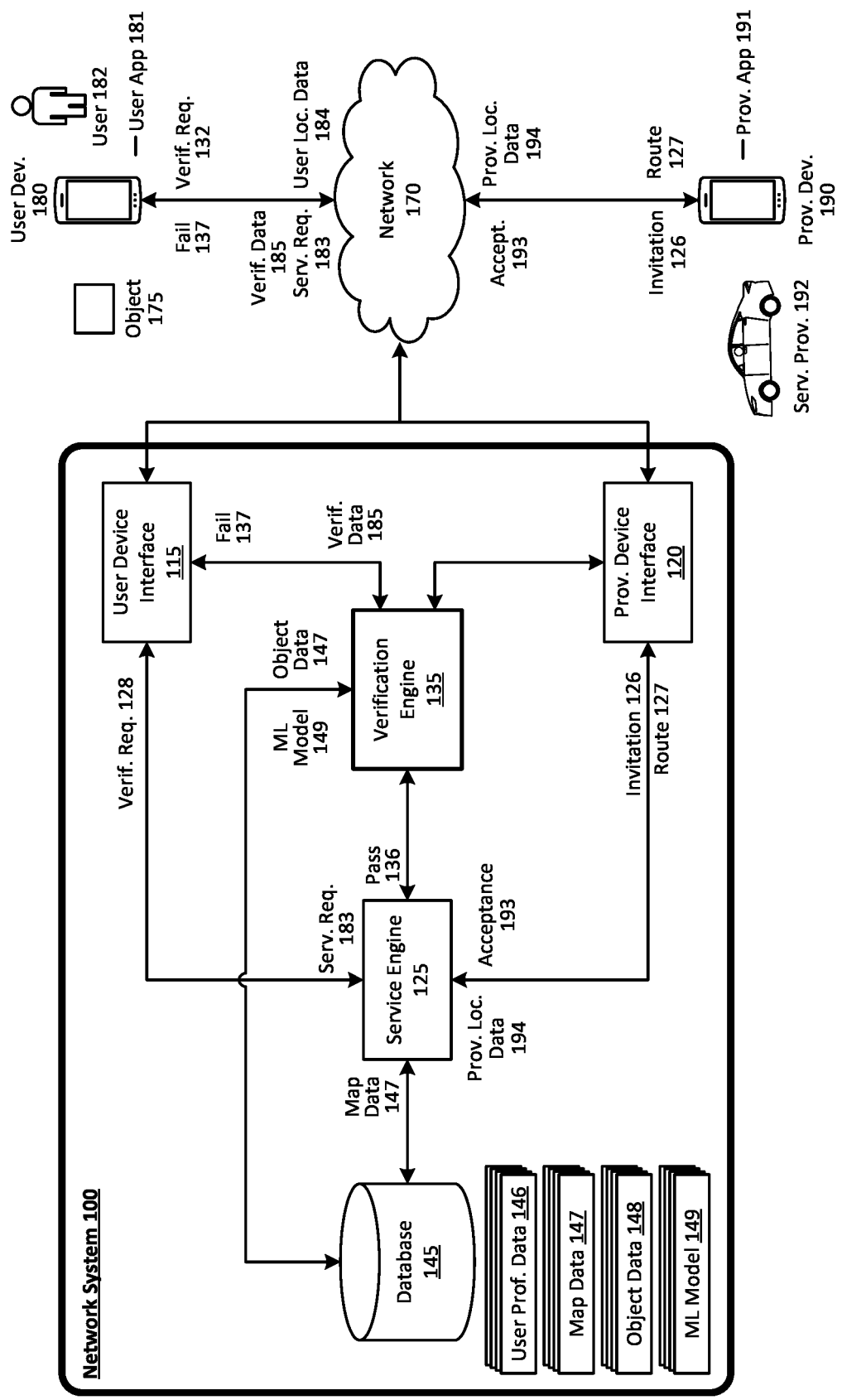
FIG. 1 is a block diagram illustrating an example network system in communication with user devices and provider devices, in accordance with examples described herein.

A network system is provided herein that manages a network-based service (e.g., a transport service, a delivery service, etc.) linking available service providers (e.g., drivers and/or autonomous vehicles (AVs)) with requesting users (e.g., riders, service requesters) throughout a given region (e.g., San Francisco Bay Area). In doing so, the network system can receive requests for service from requesting users via a designated user application executing on the users' mobile computing devices ("user devices"). Based on a start location (e.g., a pick-up location where a service provider is to rendezvous with the requesting user), the network system can identify an available service provider and transmit an invitation to a mobile computing device of the identified service provider ("provider device"). Should the identified service provider accept the invitation, the network system can transmit directions to the provider device to enable the service provider to navigate to the start location and subsequently from the start location to a service location (e.g., a drop-off location where the service provider is to complete the requested service). The start location can be specified in the request and can be determined from a user input or from one or more geo-aware resources on the user device. The service location can also be specified in the request.

In determining an optimal service provider to fulfill a given service request, the network system can identify a plurality of candidate service providers to fulfill the service request based on a start location indicated in the service request. For example, the network system can determine a geo-fence surrounding the start location (or a geo-fence defined by a radius away from the start location), identify a set of candidate service providers (e.g., twenty or thirty service providers within the geo-fence), and select an optimal service provider (e.g., closest service provider to the start location, service provider with the shortest estimated travel time from the start location, service provider traveling or en-route to a location within a specified distance or specified travel time to a service location, etc.) from the candidate service providers to service the service request. In many examples, the service providers can either accept or decline the invitation based on, for example, the route being too long or impractical for the service provider.

In certain implementations, the user application allows a user to preview aspects of the network-based service prior to submitting a service request. For instance, in the context of an on-demand transport service, the user can enter a start location and a service location to preview the expected cost of the network-based service, the estimated time of arrival at the service location, and the like. By interacting with the user application, the user can preview aspects of different service types or classes including, for example, an economy service class, a rideshare pooling service class, a limousine service class, etc. In more detail, during these interactions to preview the network-based service, the user device can transmit to the network system session data that indicates the desired start and service locations. The network system can then compute and determine various aspects of the network-based service based on the received session data. Data is then transmitted from the network system to the user device to enable the user device to render and display graphics and text to allow the user to preview the network-based service. The user can then interact with the user application to submit a service request to cause the network system to identify an optimal service provider to fulfill the requested service. Parameters and variables determined by the network system in response to the session data to preview the service can be applied to the service requested by the user.

In various aspects, in response to either the start of a user session to preview the network-based service or in response to a service request, the network system can be configured to determine whether to require object verification before proceeding with the user session or with processing the request. As used herein, object verification can refer to verifying that the user has physical possession of an object (e.g., a payment card, etc.) for use with the network-based service.

According to embodiments, in response to determining to require object verification for a given session or for a given service request, the network system can transmit a verification request over the network to the corresponding user device. In response to receiving the verification request, the user device can present a verification user interface on the display of the user device. In response to detecting one or more user actions while the verification user interface is displayed, the user device can capture a plurality of images of the object being verified. For example, the user can align the object using the viewfinder feature on the verification user interface to cause the user device to capture the plurality of images of the object. In some implementations, the plurality of images captured of the object can include a first image captured while a flashlight of the user device is deactivated (e.g., off and not illuminating) and a second image captured while the flashlight of the user device is activated (e.g., on and illuminating). The flashlight can be automatically triggered by the user device in capturing the first and second images. For instance, in response to one or more user actions, the user device can capture the first image, automatically activate the flashlight, and capture the second image.

The user device can generate and transmit to the network system verification data for verifying the object. The verification data can include a set of light reflectivity metrics generated by performing light reflectivity analysis. The light reflectivity metrics can be numerical or statistical representations of one or more aspects of how light reflects off the surface of the object and can be indications of whether the object has an expected surface material. According to variations, the network system or the user device can perform the light reflectivity analysis and/or other analyses. In the example of verifying a payment card, the light reflectivity analysis can help distinguish a physical card (e.g., plastic or metal) from an image of a payment card printed on a piece of paper or displayed on a screen. The light reflectivity analysis can determine whether the light reflectivity characteristics of the object (e.g., intensity of light reflection, light reflection patterns) are within acceptable ranges that are indicative of plastic or metal material surfaces. The light reflectivity metrics can be generated by the user device based on analyzing the first image (flash on) and the second image (flash off). For instance, the user device can compare the first and second images to determine the intensity and/or the pattern of light reflection of the surface of the object. In some implementations, the light reflectivity metrics can be generated using a pixel-by-pixel comparison of the two images (or groups of pixels to groups of pixels comparison of the two images). In one example, the user device can generate a pixel delta map comprising the deltas of the pixel values (e.g., representing luminance values) between the first and second images.

In the examples described herein, the verification data can further include results of a feature location mapping analysis. The feature location mapping analysis can determine whether visible features of the object are located at the expected locations on the object. In the context of verifying a physical payment card, the visible features can correspond to logos, signature boxes, imprinted text or numbers (e.g., name, card number, expiration date, etc.), and the like. In one implementation, the user device can recognize various types of visible features and determine their respective locations. The verification data can indicate the features identified and their respective locations. Based on the verification data, the network system can determine whether the identified features are located at expected locations. To do so, the network system can retrieve an object template that specifies the expected locations of the identified features. For instance, an object template for a given payment card can be retrieved based on the given payment card's issuer, payment network, brand, etc. The network system can maintain the object templates or can communicate with computer systems of financial institutions (e.g., the issuer of the payment card) to retrieve the object templates.

According to embodiments, the network system can generate an aggregate determination of whether the object verification process has passed based on the various results or data of the different analyses performed by the user device and/or the network system. This aggregate determination can be made using a machine-learned model that is trained over time based on prior instances of the object verification process.

In comparison with convention methods to verify possession of an object, examples described herein provide significant technical advantages. In one aspect, by performing light reflectivity analysis (e.g., determining light reflectivity metrics indicating light reflectivity intensity and patterns), embodiments described herein can determine whether the object being verified is composed of the expected surface material and thereby ensure and improve the integrity and accuracy of the object verification process. In addition, examples described herein perform certain object verification tasks by the user device while other steps are performed by the network system. In this manner, privacy of sensitive data (e.g., raw image data of the object being verified) can be maintained since the sensitive data is not transmitted over the network to the network system. In addition, by utilizing both the network system and the mobile computing device to verify the authenticity of an object, large amounts of data (e.g., object templates needed to perform feature location mapping analysis, acceptable baseline data for light reflectivity analysis, etc.) needed to perform object verification can be stored by the network system and thus do not need to take up valuable storage space on the mobile computing device.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Descriptions

FIG. 1 is a block diagram illustrating an example network system in communication with user devices and provider devices, in accordance with examples described herein. Network system 100 can implement or manage a network-based service (e.g., an on-demand transport service, an on-demand delivery service, etc.) that connects requesting users 182 with service providers 192 that are available to fulfill the users' service requests 183. The network system 100 can provide a platform that enables on-demand services to be provided by an available service provider 192 for a requesting user 182 by way of a user application 181 executing on the user devices 180, and a provider application 191 executing on the provider devices 190. As used herein, a user device 180 and a provider device 190 can comprise a computing device with functionality to execute a designated application corresponding to the on-demand service managed by the network system 100. In many examples, the user device 180 and the provider device 190 can comprise mobile computing devices, such as smartphones, tablet computers, VR or AR headsets, on-board computing systems of vehicles, smart watches, and the like. In one example, a service provider fulfilling a service request includes the service provider rendezvousing with the user at start location (e.g., a pick-up location) to pick up the user and transporting the user to a service location (e.g., a destination location).

The network system 100 can include a user device interface 115 to communicate with user devices 180 over one or more networks 170 via the user application 181. According to examples, a requesting user 182 wishing to utilize the network-based service can launch the user application 181 and can cause user device 180 to transmit, by using the user application 181, a service request 183 over the network 170 to the network system 100. In certain implementations, the requesting user 182 can view multiple different service types managed by the network system 100. In the context of an on-demand transport service, service types can include a ride-share service, an economy service, a luxury service, a professional service provider service (e.g., where the service provider is certified), a self-driving vehicle service, and the like. In certain implementations, the available service types can include a rideshare-pooling service class in which multiple users can be matched to be serviced by a service provider. The user application 181 can enable the user 182 to scroll through the available service types. The user application 181 can also enable the user 182 to enter the start and service locations for a prospective service request. In one aspect, the service request 183 can be generated by the user device 180 in response to the user entering the start and service locations within the user application 181 for a prospective service request 183. The service request 183 can indicate the start and service locations. In response to receiving the service request 183, the network system 100 can provide content data (e.g., content data 133) to cause the user device 180 to display ETA data on a user interface of the user application 181 that indicates an ETA of the closest service provider for the service type, the locations of all proximate available service providers for that service type, and/or the estimated cost for requesting each of the available service types. As the user scrolls through the available service types, the user interface can update to show visual representations of service providers for that service type on a map centered around the user 182 or a start location set by the user. The user 182 can interact with the user interface of the user application 181 to select a particular service type and transmit a service request 183.

According to embodiments, the network system 100 can include a service engine 125 that can perform a number of functions in response to receiving the service request 183 from the user device 180. For instance, in response to receiving the service request 183, the service engine 125 can identify a candidate service provider 192 to fulfill the service request 183. The service engine 125 can receive provider location data 194 transmitted from the provider devices 190 to identify an optimal service provider 192 to service the user's service request 183. The optimal service provider 192 can be identified based on the service provider 192's location, ETA to the start location, status, availability, and the like.

In various aspects, the service engine 125 can transmit an invitation 126 to the provider device 190 of the selected service provider 192. The invitation 126 can be transmitted over the network 170 via a provider device interface 120 that communicates with provider devices 190. In response to receiving the invitation 126, the provider application 191 can display a prompt for the service provider 192 to accept or decline the invitation 126. Should the service provider 192 accept the invitation 126, the provider application 191 can cause the provider device 190 to transmit an acceptance 193 to the network system 100. In response to receiving the acceptance 193 from the provider device 190, the network system 100 and the service engine 125 can perform a number of operations to facilitate the fulfillment of the requested service by the service provider 192. As an example, the service engine 125 generate an optimal route 127 for the service provider 192 to fulfilling the service request 183. The route 127 can be generated based on map data 147 stored within a database 145. The route 127 can include a segment from the current location of the service provider 192 (e.g., based on the provider location data 194) to the start location and another segment from the start location to the service location. The route 127 can also include other intermediate locations such as a drop-off location for another user of a ride-share transport service, etc. The provider device interface 120 can transmit the route 127 to the provider device 190 via the one or more networks 170. The provider device 190 can display, via the provider application 191, turn-by-turn directions for the service provider 192 based on the route 127 generated by the service engine 125. In some implementations, the service engine 125 can transmit the start and service locations to the service provider device 190 and the provider devices 190 and the provider application 191 can generate one or more routes and turn-by-turn directions for the service provider 192 necessary to fulfill the service request 183.

In various examples, the network system 100 can maintain user data for the requesting user 182 in the database 145 in the form of user profile data 146. The user profile data 146 can include information relating to services requested by the user 182 in the past, frequently visited locations associated with the network-based service (e.g., home location, office address, etc.), and the like. The user profile data 146 can also include payment information (e.g., credit/debit card information, etc.) used by the network system 100 to process the user 182's payments for the network-based service. In some implementations, the user 182 can enter payment information via the user application 181. For instance, the user 182 can be prompted, either while setting up a user account or profile for the network-based service or before submitting a request for service.

According to embodiments, the network system 100 and the user device 180 can together perform object verification in order for the user 182 to verify that she or he has possession of an object 175 before proceeding with processing the service request 183 from the user 182. As an example, the object verification actions can be used to verify that the user 182 has possession of a payment card that is associated with the user 182's user profile. In one implementation, in response to a service request 183, the service engine 125 can retrieve the user profile data 146 of the requesting user 182. The service engine 125 (or another component of network system 100) can determine, based on analyzing the user profile data 146, whether to require the user 182 to perform object verification before proceeding with processing the service request 183. In other implementations, the service engine 125 can determine whether to require object verification in response to the user initiating a session to preview the network-based service from a start location to a service location within the user application 181, in response to the user entering information relating to the object 175 within the user application, or in response to the user 182 setting up his or her user account or profile. If it is determined that the user 182 must verify his or her payment information, the network system 100 can transmit a verification request 128 to the user device 180 over the network 170.

In response to receiving the verification request 128, the user device 180 can display a verification user interface using which the user 182 can perform object verification. In some implementations, the user device 180 can capture a plurality of images of the object 175. The user device 180 processes the captured images to generate verification data 185 to be transmitted to the network system 100. Certain object verification actions can be performed on the user device 180 so that the captured images, which may contain sensitive data and information, and other raw data need not be transmitted over the network 170 to the network system 100. The user device 180 can further encrypt the verification data 185 to ensure secure delivery of the verification data 185.

According to embodiments, the network system 100 includes a verification engine 135 that receives the verification data 185 from the user device 180 and makes a determination as to whether the object verification has passed or has failed. If the verification engine 135 determines that the object verification has passed, the verification engine 135 can transmit a passing verification result 136 to the service engine 125 to cause the service engine 125 to, for example, proceed with processing the user 182's service request 183. On the other hand, if the verification engine 135 determines that the object verification has failed, the verification engine 135 can transmit a failing verification result 137 to the user device 180. In response, the user device 180 can present the user 182 with various options to proceed in performing one or more remedial actions such as entering information for another credit or debit card, verifying the payment information directly with the issuing financial institution, speaking with a customer representative, and the like.

The object verification process can include a number of analyses to determine the whether the image captured by the camera of the user device 180 depicts an authentic object 175. The analyses can include light reflectivity analyses, feature location mapping analyses, object information matching analyses, 3D feature recognition, etc. The verification engine 135 can determine whether object verification has passed or failed based on a combination of these analyses. For instance, the user device 180 can perform one or more of the analyses and can transmit the results thereof (e.g., scores, metrics, etc.) as part of the verification data 185 transmitted to the network system 100. The verification engine 135 can utilize a machine-learned model 149 stored in the database 145 to generate an aggregate determination as to whether the object 175 captured in images by the user device 180 is authentic. In addition or as an alternative, the verification data 185 can include data (e.g., data extracted from or values computed based on the captured images) that enables the verification engine 135 or other components of the network system 100 to perform one or more of the analyses described herein.

In one aspect, the verification data 185 can indicate the results of light reflectivity analysis of the object being verified. The results of the light reflectivity analysis can be an indication of whether the surface of the object 175 is made up of an expected material. In the example of attempting to verifying a physical payment card, the light reflectivity analyses can help distinguish a physical (e.g., plastic or metal) credit card from an image of a card printed on a piece of paper or displayed on a screen. The analyses can determine whether the light reflectivity characteristics of the object (e.g., intensity of light reflection, light reflection patterns) are within acceptable ranges that are indicative of plastic or metal material surfaces. The reflectivity analyses can be performed by the user device 180 using at least two images captured of the object being verified—a first image captured with the flashlight of the user device 180 being off and another image captured with the flashlight being illuminated. The images can be captured substantially contemporaneously. For example, the user device 180 can capture both images in quick succession in response to a user input and can turn on (and/or off) the flashlight automatically in the process. By comparing the two images (e.g., computing the average difference in the pixel luminance values of the two images), the user device 180 can determine whether the light reflectivity characteristics are within acceptable ranges.

In some implementations, the verification engine 135 of the network system 100 can perform the light reflectivity analyses. In these implementations, the verification data 185 transmitted from the user device 180 to the network system 100 can include data such as the pixel luminance values of the two images to enable verification engine 135 to perform the light reflectivity analyses. In another implementation, the combination of the network system 100 and the user device 180 can perform the light reflectivity analyses. For instance, the user device 180 can compute the light reflectivity characteristics of the object 175 being verified based on the captured images and the verification engine 135 can determine whether the light reflectivity characteristics are within acceptable ranges. In this manner, the light reflectivity analyses can be dynamically tailored to a given object 175 being verified while still utilizing the available resources of the user device 180. For instance, in verifying that the user 182 has possession of a particular brand of credit card, the verification engine 135 can determine (e.g., based on communicating with a card issuer or based on publicly available data) that the credit card is only issued as metal cards with. Based on this information, the verification engine 135 can set the acceptable ranges of the light reflectivity analyses accordingly.

In another aspect, the verification engine 135 can analyze the verification data 185 to perform feature location mapping analysis. In doing so, the verification engine 135 can retrieve an object template (e.g., stored as object data 148 in database 145) and compare the template to determine whether locations of features on the object 175 match with the object template. For example, in verifying a payment card, the features analyzed can include logos, card numbers, expiration dates, signature boxes, and the like. The verification data 185 can indicate respective locations (e.g., relative to borders of the object 175, in a coordinate system, etc.) of each of the features on the object 175. The verification engine 135 can retrieve a corresponding object template, which can provide a known and verified baseline of locations of features expected for the object 175 being verified. The results of the location mapping analysis can indicate a percentage of the features that are determined to be in the correct positions on the object 175 based on the object template data.

The verification engine 135 can also be configured to analyze the verification data 185 to perform object information matching analysis. The verification data 185 can include detected textual information regarding the object 175 detected using optical character recognition technique performed on images captured of the object 175. The verification engine 135 can compare the detected textual information against known information of the object stored in the database. In the example of verifying that object 175 is an authentic payment card, the detected textual information can include a name associated with the payment card as depicted on object 175. The verification engine 135 can compare the name against the name of the user 182 stored in the user profile data 146 to determine whether the name of the user 182 matches the name depicted on object 175. In certain implementations, the verification engine 135 can further analyze the verification data 185 to perform 3D feature recognition analysis. For this analysis, the user device 180 can perform analysis on the captured images of the object 175 to identify shadows (if any) in the images cast by one or more protrusions on the surface of the object 175 and to determine whether the shadows are uniform (e.g., that they are authentic shadows and not generated images). This can be useful for verifying the authenticity of payment cards that may have protrusions comprising the payment card numbers. The verification data 185 transmitted from the user device 180 can include an indication of whether the 3D feature analysis has passed or failed.

According to embodiments, the verification engine 135 is configured to generate an aggregate determination as to whether object verification process has passed (e.g., whether the object 175 captured by the camera of the user device 180 is authentic). In doing so, the verification engine 135 can determine whether the object verification process has passed based on the aggregate of the data available, including the results of the various verification analyses performed by the user device 180 and the network system 100. Thus, in some instances, the verification engine 135 can determine that the object verification process has passed even though one or more analyses has been deemed to have failed. For example, in verifying a particular object 175, the 3D feature recognition analysis can indicate a failing score but the other analyses (e.g., light reflectivity analysis, feature location mapping analysis, object information matching analysis, etc.) can indicate respective passing scores or metrics. In this particular instance, the verification engine 135 can generate an aggregate determination that the object verification process for the object 175 has passed based on the aggregate data available. In certain implementations, the verification engine 135 can generate the aggregate determination using a machine-learned model 149. The inputs to the machine-learned model 149 can be results or metrics generated by the verification analyses (e.g., results of the light reflectivity analyses, feature location mapping analyses, etc.). The machine-learned model 149 can be trained over time based on past instances of the object verification process performed by users of the network-based system. In the context of verifying payment cards, the machine-learned model 149 can be further trained based on data indicating events associated with the network-based service after the object verification process, such as whether payment cards verified ultimately accepted or declined by financial institutions or whether the failures in the object verification processes were false positives (e.g., remedied by the user 182 in communication with a customer service representative).

Figure 2:
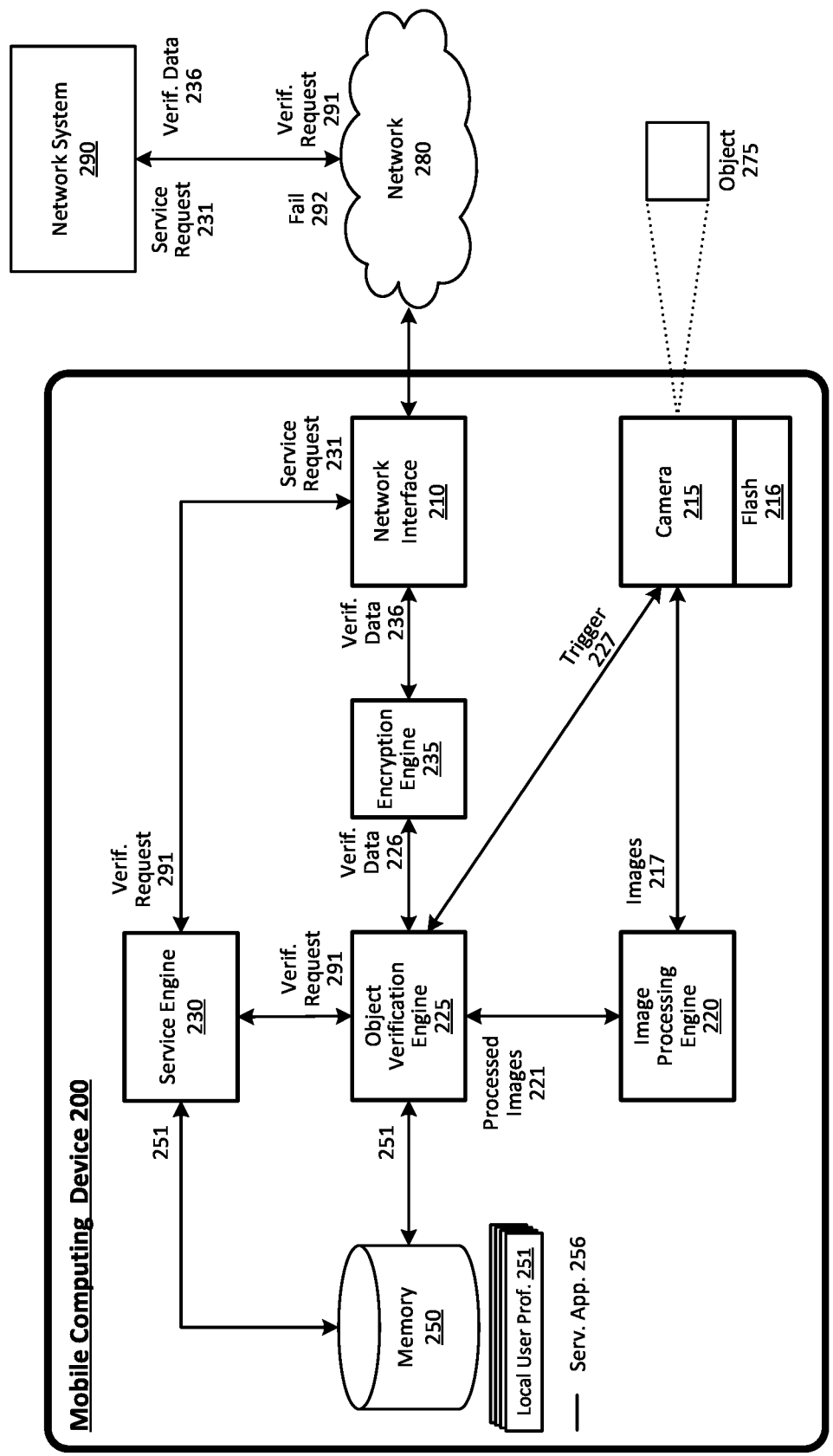
FIG. 2 is a block diagram illustrating an example mobile computing device in communication with an example network system, in accordance with examples described herein.

FIG. 2 is a block diagram illustrating an example mobile computing device in communication with an example network system, in accordance with examples described herein. In the below description of FIG. 2, references may be made to features and examples shown and described with respect to FIG. 1. For instance, network system 290 can be an embodiment of network system 100 illustrated in and described with respect to FIG. 1 and user device 180 of FIG. 1 can be an embodiment of mobile computing device 200 illustrated in FIG. 2. The mobile computing device 200 can further operate as provider device 190 of FIG. 1.

According to embodiments, the mobile computing device 200 can comprise a memory 250 (or a combination of various memory elements) that stores a service application 256. The mobile computing device 200 can execute the service application 256 to provide a user of the mobile computing device 200 with various functionalities to interact with and request a network-based service managed by network system 290. The memory 250 can further store a local user profile 251 that includes the user's information in support of the operations of the service application 256. In implementations where the mobile computing device 200 operates as a user device (e.g., user device 180 of FIG. 1), the service application 256 can correspond to a user application. In other implementations where the mobile computing device 200 operates as a provider device (e.g., provider device 190 of FIG. 1), the service application can correspond to a provider application. The mobile computing device 200 includes a network interface 210 to communicate with the network system 290 over a network 280.

In various aspects, the mobile computing device 200 can include a service engine 230. As the user interacts with user interfaces of the service application 256 to request the network-based service, the service engine 230 can generate a service request 231 to be transmitted to the network system 290. Referring back to FIG. 1, the service request 231 can correspond to service request 183 illustrated in FIG. 1. In response to receiving service request 231, the network system 290 can identify a service provider to fulfill the service request 231 for the user.

In some implementations, the network system 290 can determine that one or more verification actions need to be performed for the user. This determination can be made during the processing of the service request 231 or can be made prior to the service request 231 being generated and transmitted. For instance, this determination can be made while the user is previewing service options (e.g., viewing service classes, ETA, prices, etc.) in the user application prior to submitting the request for service. In response to this determination, the network system 290 can transmit a verification request 291 to the mobile computing device 200. The verification request 291 can correspond to a request to verify a payment option to be charged in connection with the service request 231. In response to receiving the verification request 291, the mobile computing device 200 can perform a number of functions to verify a physical payment card (e.g., credit card, debit card, etc.) using various imaging techniques described herein. Data generated during the verification process can be encrypted and transmitted to the network system 290 for further processing to determine whether the verification process has passed or failed. In response, the network system 290 can determine whether to require the user to perform one or more remedial actions before the request for service can be fulfilled.

In the examples described herein, the service engine 230 can forward the verification request 291 to an object verification engine 225 to initiate an object verification procedure. One example of an object verification procedure is illustrated in and described with respect to FIG. 4. In response to receiving the verification request 291, the object verification engine 225 can cause a verification user interface (e.g., user interface 500 of FIG. 5A) to be displayed on a screen of the mobile computing device 200. Within this user interface, the user can be instructed to capture images of a physical payment card that is to be verified via the verification process.

In one or more implementations, the user can be prompted to align a payment card with visual guides in the verification user interface. For instance, the object verification engine 225 can monitor the output of a camera 215 of the mobile computing device 200 to generate a trigger 227 to cause the camera 215 to automatically capture images of an object 275 to be verified as soon as the object 275 is determined to be aligned with the visual guides displayed within the verification user interface. In addition or as an alternative, the verification user interface displayed on the screen of the mobile computing device 200 can also include a user interface feature (e.g., a "Capture Image" soft button) to capture images of the object 275. The captured images 217 of the object 275 can be processed by an image processing engine 220. The image processing engine 220 can, for example, convert one or more of the images 217 to grey-scale, align two or more of the images, alter the contrast of the images 217, and the like. The processed images 221 are transmitted to the object verification engine 225 for additional processing.

According to embodiments, the object verification engine 225 can perform one or more analyses to determine whether the object 257 captured by the camera 215 of the mobile computing device 200 is authentic. The object verification engine 225 can perform verification analyses based on the processed images 221. The verification analyses can include light reflectivity analysis, feature location mapping analysis, object information matching analysis, 3D feature recognition analysis, and the like. These analyses are illustrated in and described with respect to at least FIGS. 1, 4A, and 4B. In performing these analyses, the object verification engine 225 can generate verification data 226. The verification data 226 can include metrics or results of the verification analyses. The verification data 226 can also include data associated with the verification analyses such that the network system 290 can perform some or all of the steps of one or more of the verification analyses. In certain implementations, the mobile computing device 200 can include an encryption engine 235 to encrypt some or all of the verification data 226 for transmission over the network 280 to the network system 290. The encrypted verification data 236 can be transmitted to the network system 290 over the network 280 via the network interface 210.

According to embodiments, in response to receiving the verification data 236, the network system 290 can generate an aggregate determination as to whether the object verification process for object 275 has passed or failed (e.g., whether the object 275 captured in the images 217 is authentic). If the network system 290 determines that the object verification process has failed, the network system 290 can transmit a fail signal 292 to the mobile computing device 200. In response to receiving the fail signal 292, the service application 256 executing on the mobile computing device 200 can cause a second verification user interface to be displayed. This second verification user interface (e.g., user interface 550 of FIG. 5B) can present the user with options in proceeding with the network-based service such as contacting customer service, changing a payment method, or canceling the session or the service request.

Methodology

Figure 3:
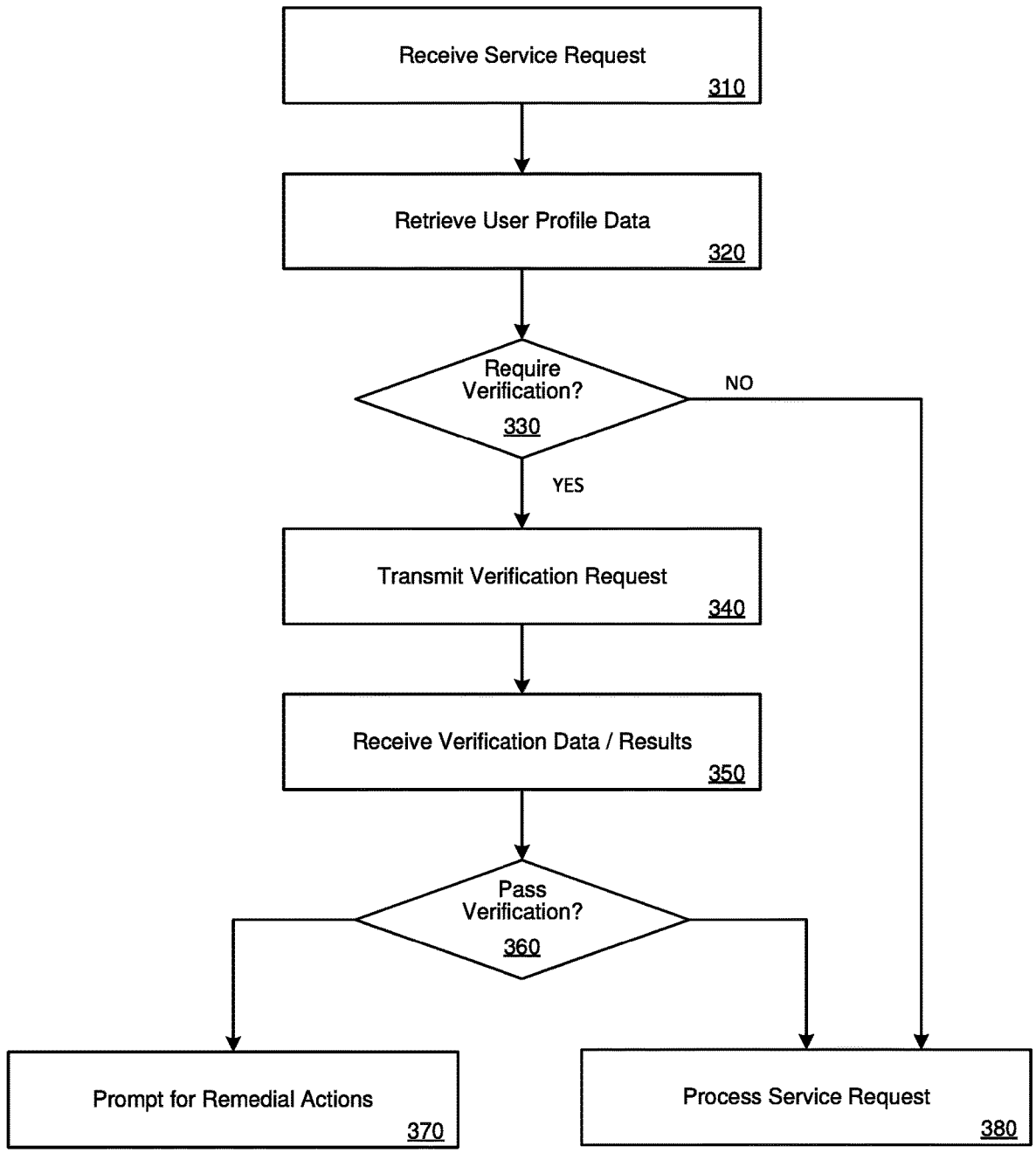
FIG. 3 is a flowchart illustrating an example method of processing a service request for a network-based service, in accordance with examples described herein.

FIG. 3 is a flowchart illustrating an example method of processing a service request for a network-based service, in accordance with examples described herein. In the below description of FIG. 3, references may be made to features and examples shown and described with respect to FIGS. 1-2. For instance, the example method can be performed by an example network system 100 of FIG. 1 or by an example network system 290 of FIG. 2.

Referring to FIG. 3, the network system (e.g., network system 100 of FIG. 1) can receive a service request (e.g., service request 183 of FIG. 1) (310). The service request can be received over a network from a user device (e.g., user device 180 of FIG. 1 or mobile computing device 200 of FIG. 2) executing a user application. In response to the user's interaction with the user application, the user application and the user device can cause a service request to be transmitted to the network system. Data transmitted to the network system that corresponds to the service request can include identifying information of the user. For instance, a unique user ID assigned to the user by the network system can be transmitted as part of the service request. The service request can also include other information relating to the service being requested. For example, in the context of an on-demand transport service, the service request can also identify a start location (e.g., a location where a transport service provider is to rendezvous with the requesting user) and a service location (e.g., a location where the transport service provider is to drop-off the requesting user).

In response to receiving the service request, the network system can retrieve the user's profile data (320). According to embodiments, the network system can maintain a plurality of user profiles, one for each user of the network-based service. Each user profile can include information relating to the corresponding user. In the context of an on-demand transport service, the user profile can include the user's frequently visited locations, the user's home and/or work address, the user's usage history of the network-based service (e.g., past trips, etc.), and the like. In various examples, the user profile information can also include payment information such as the user's credit card or debit card information. In fulfilling the user's service requests, the network system can use the payment information to process payments in exchange for the requested services.

Prior to processing the received service request, the network system can determine whether to require the user to verify his or her payment information (330). The verification of the user's payment information can include verifying a physical payment card (e.g., credit or debit card). The verification can be performed to prevent fraudulent transactions using fabricated or stolen payment card information for which a fraudulent user does not have the corresponding physical payment card. Thus, by requiring the user to verify a physical payment card, the network system can ensure that the user has possession of the physical payment card that is being used for the request for the network-based service. In this manner, integrity of the transaction and the network-based service can be maintained. In various examples, the network system can use a variety of criteria to determine whether to require the user to verify his or her payment information. The network system can make this determination based on the user's history with the network-based service. For example, a newly-registered user or a user that has not been recently active in utilizing the network-based service can be required to perform object verification before proceeding with previewing the network-based service or submitting service requests. The network system can also make this determination based on specific information associated with the user or the given session or service request. For instance, the network system can determine to require the user to perform object verification if the user is requesting or previewing the network-based service for a start location or a service location that has not been previously associated with the user. As another example, the network system can determine to require the user to perform object verification if a new payment method is being used with the user's account.

If the network system determines that object verification is not required for the user to proceed with the particular session or service request, the network system can proceed with processing the request or the session (380). Thus, the network system can generate data for previewing the network-based service or to identify suitable service providers to fulfill the service request. On the other hand, if the network system determines that verification is required for the user, the network system can transmit a verification request to the user device (340). In response to the verification request, the user application executing on the user device can cause a verification user interface to be displayed on a screen of the user device. By interacting with the user application and the verification user interface, the user can perform one or more verification steps to verify his or her possession of one or more physical payment cards.

The determination can be based on the user's profile information. In one aspect, the network system can determine to request the user to verify payment information based on the history of the user profile. For example, the user profile can indicate that the user recently modified his or her payment information (e.g., added a new credit card, etc.) and based on this information, the network system can determine to request the user to verify payment information. In another example, the network system can determine to request the user to verify payment information based on the user profile indicating one or more suspicious activities conducted by the user.

If network system determines to request verification from the user, the network system can transmit a verification request to the user device (340). The verification request can cause the user device to present a verification user interface using which the user can cause a plurality of images of a physical payment card to be captured by a camera of the user device. The user device can evaluate and analyze the captured images to generate verification data for transmission to the network system. At step 350, network system receives the verification data from the user device.

Based on the verification data, the network system can generate an aggregate determination as to whether the object verification process has passed or failed (360). If the network system determines that the object verification process has failed, the network system can transmit a fail signal or indication to the user device to cause the user device to prompt the user to perform remedial actions in order to proceed with the network-based service (370). If the network system determines that the object verification process has passed, the network system can proceed with processing the service request (or the session for previewing the network-based service) (380).

Figure 4A:
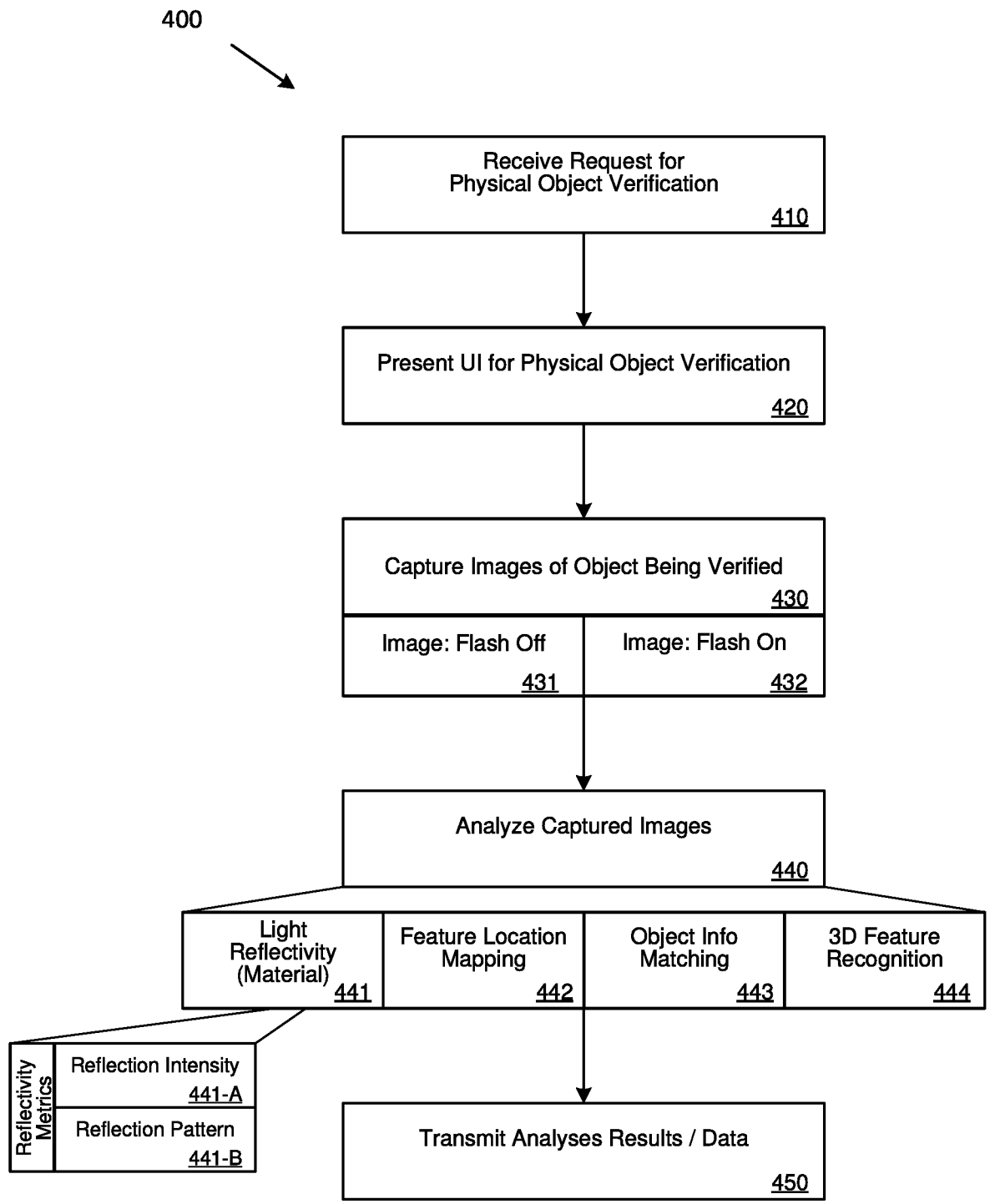
FIG. 4A is a flowchart illustrating an example method of performing object verification, in accordance with examples described herein.

FIG. 4A is a flowchart illustrating an example method of performing object verification, in accordance with examples described herein. In the below description of FIG. 4, references may be made to features and examples shown and described with respect to FIGS. 1-3. For instance, the example method can be performed by an example user device 180 of FIG. 1 or by an example mobile computing device 200 of FIG. 2.

Referring to FIG. 4, mobile computing device (e.g., mobile computing device 200 of FIG. 2) can receive a request (e.g., verification request 291 of FIG. 2) to verify can object from a network system managing a network-based service (410). The verification request can be transmitted over a network and can correspond to a request to verify that the user has physical possession of an object (e.g., a payment card).

In response to receiving the verification request, a service application (e.g., user application 181 of FIG. 1, service application 256 of FIG. 2, etc.) executing on the mobile computing device can cause a verification user interface to be presented on a display of the mobile computing device (420). An example verification user interface is illustrated in FIG. 5A. The user can interact with the verification user interface to perform object verification in response to the verification request from the network system. The mobile computing device can capture a plurality of images of the object being verified in response to one or more user actions while the verification user interface is displayed (430). For example, the user can align the object with one or more visual guides in a camera viewfinder feature within the verification user interface (or activating a "Capture Image"

soft selection within the verification user interface) to cause the mobile computing device to capture a plurality of images of the object being verified. The mobile computing device can capture a first image of the object with the flashlight of the mobile computing device being deactivated (e.g., not illuminating) (431) and a second image of the object with the flashlight of the mobile computing device being activated (e.g., illuminating) (432). The flashlight can be automatically triggered by the user device in capturing the first and second images. For instance, in response to one or more user actions, the mobile computing device can capture the first image, automatically activate the flashlight, and capture the second image.

The mobile computing device can analyze the captured images (440). The analyses performed can include a light reflectivity analysis (441), a feature location mapping analysis (442), object information matching analysis (443), and a 3D feature recognition analysis (444). Subsequently, the mobile computing device can transmit the verification data (e.g., verification data 185 of FIG. 1 or verification data 236 of FIG. 2) to the network system (450). The verification data can correspond to the results of the analyses performed in step 440. In doing so, the raw data such as the captured images of the object—which may contain sensitive or private information—need not be transmitted to the network system over the network. In some implementations, the verification data can correspond to a composite metric of the analyses performed by the mobile computing device. In other implementations, the verification data can include individual metrics or data of each of the analyses performed in step 440. In this manner, additional processing of each of the analyses can be performed by the network system based on the received verification data.

With respect to the light reflectivity analysis (441), the mobile computing device can compute one or more light reflectivity metrics based on comparing the first image of the object (e.g., flashlight deactivated) against the second image (e.g., flashlight activated). The light reflectivity analysis can generate metrics that indicate the intensity of the light reflection from the object being verified (441-A) as well as the pattern of the light reflection from the object being verified (441-B).

For the feature location mapping analysis (442), the mobile computing device can identify one or more visible features of the object captured in the images and compare the locations of those visible features against a template for the object that indicates expected locations of those visible features. The mobile computing device can retrieve the appropriate template for the object from an internal database or from an external resource. In the example of verifying a payment card, the mobile computing device can retrieve the appropriate object template based on, for example, the card issuer, the card type, a portion of the card number, and the like.

With respect to the object information matching analysis (443), the mobile computing device can compare detected textual information captured in images of the object against known information of the object. As an alternative, the detected textual information can be transmitted to the network system such that the network system can perform the object information matching analysis. In the context of verifying a payment card, detected text such as the user's name, expiration date of the card, and the like can be compared against information stored in the user's profile.

In addition, the mobile computing device can be further configured to perform 3D feature recognition analysis (444) in which shadows casted by protruding features of the object (if any) are identified and analyzed for consistency to ensure that the detected shadows are not fabricated (e.g., drawn or painted) on the surface of the object. This technique can be useful to separate an authentic payment card that has protruding features such as card numbers from a two-dimensional imitation (e.g., image of the card printed on a piece of paper or displayed on a screen). The mobile computing system can analyze the plurality of images, including a first image captured with the flash deactivated and a second image captured with the flash activated to compare the shadows casted by the protruding features to determine whether the three dimensional features on the object are authentic.

At step 450, the data or results from the object verification analyses are transmitted to the network system so that the network system can generate an aggregate determination as to whether the object verification process has passed.

FIG. 4B is a flowchart illustrating an example method of performing light reflectivity analysis, in accordance with examples described herein. In the below description of FIG. 4B, references may be made to FIGS. 1 to 4A. For instance, the light reflectivity analysis 460 illustrated in FIG. 4B can be performed by the mobile computing device 200 of FIG. 2. In addition, the light reflectivity analysis 460 illustrated in FIG. 4B can also be part of the method of performing object verification illustrated in FIG. 4A.

Referring to FIG. 4B, the light reflectivity analysis 460 can be performed by the mobile computing device based on least two images captured of the object being verified—a first image captured with the flashlight of the mobile computing device being off and a second image captured with the flashlight being illuminated. The first and second images can be captured substantially contemporaneously. For example, the mobile computing device can capture both images in quick succession in response to a user input and can turn on (and/or off) the flashlight automatically during the process. This can help ensure that the first and second images are aligned (e.g., the mobile computing device and the object are not moved between taking the first and second images). In certain implementations, the mobile computing device can convert the first and second images to greyscale (465). In this manner, the value of each pixel of the greyscale images can be a luminance value. As an alternative, the first and second images can be captured by the camera of the mobile computing device as greyscale images. The mobile computing device can also be configured to align the greyscale images if they are determined to be not properly aligned (470).

The mobile computing device can generate a pixel delta map representing the pixel value deltas between the greyscale images (475). The pixel delta map can have the same resolution as the first and second images (e.g., same number of pixels). Each pixel of the pixel delta map can have a value indicating the light reflection intensity of the object as measured by the camera of the mobile computing device at that particular pixel location. In more detail, for each pixel location of the pixel delta map, the mobile computing device can determine the corresponding pixel value by computing the difference in values between the corresponding pixel locations of the first and second images. For example, to determine the value for a given pixel at the location <100, 100> (e.g., 100th pixel from the 0 position horizontally and 100th pixel from the 0 position vertically) on the pixel delta map, the mobile computing device can compute the difference between the corresponding pixel values at pixel location <100, 100> of the first and second images (or the converted greyscale images). The mobile computing device can subtract the value of the first image at pixel location <100, 100> from the value of the second image at pixel location <100, 100> to determine the value of the pixel delta map at the pixel location <100, 100>. This pixel value on the pixel delta map can represent the luminance value of the light reflection of the object captured by the camera at pixel location <100, 100>. To generate the pixel delta map, the mobile computing device can perform this computation for all the pixels on the pixel delta map.

Based on the pixel delta map, the mobile computing device can compute a measure of the intensity of light reflectivity of the object (480) and a measure of the pattern of light reflectivity of the object (485). With respect to the measure of intensity, the mobile computing device can compute a statistical measure of the pixel values of the pixel delta map. For example, the user device can compute one or more of the following of the pixel delta map to arrive at a metric representing the intensity of the light reflection of the object being verified: (i) an average or median pixel (e.g., luminance) value, (ii) the maximum and/or minimum pixel value, (iii) the sum of the pixel values, and the like. With respect to the measure of pattern of light reflectivity, the mobile computing device can determine a radius of light reflectivity. In one example, a center point of the pixel delta map can be defined and the mobile computing device can compute the mean or average weighted distance from the center point for each radial segment on the pixel delta map.

In some implementations, the determination as to whether the light reflectivity metrics (e.g., intensity and/or pattern) are deemed acceptable can be performed by the mobile computing device. For example, the mobile computing device can locally store baseline values relevant to the light reflectivity metrics. The baseline values can be predetermined and can indicate acceptable ranges for the reflectivity metrics. For instance, in verifying a physical payment card, the baseline values can include ranges of light reflectivity intensities and radii typically measured for plastic or metal payment cards. In these implementations, the verification data transmitted by the mobile computing device to the network system can include a result of the comparison of the determined light reflectivity metrics with the baseline values. The verification data can thus indicate whether the light reflectivity analysis has passed or failed.

In other implementations, the determination as to whether the light reflectivity metrics are deemed acceptable can be performed by the network system. In these implementations, the light reflectivity metrics can be transmitted by the mobile computing device as part of the verification data to the network system. In some examples, the network system (or the mobile computing device) can compare the light reflectivity metrics against baseline values that are specifically retrieved based on known information associated with the object being verified. As one example, based on information regarding a payment card being verified (e.g., type, issuer, card brand, a portion of the payment card number, etc.) the network system can determine that the payment card has a metal surface. Thus, the network system can compare the light reflectivity metrics against baseline values that are associated with cards having metal surfaces. As another example, the network system can also retrieve baseline values determined using data generated by verifications of similar cards (e.g., same issuer, same brand, etc.) that were previously verified by other users of the network-based system.

User Interface

FIGS. 5A and 5B illustrate example user interfaces displayed on a user device for performing object verification, in accordance with examples described herein. In the below description of FIG. 4, references may be made to features and examples shown and described with respect to FIGS. 1-3. For instance, the user interfaces 500 of FIG. 5A and 550 of FIG. 5B can be displayed or presented on user device 180 of FIG. 1 or mobile computing device 200 of FIG. 2.

Referring to FIG. 5A, the verification user interface 500 can be displayed on a user device in response to a verification request received from the network system. The verification user interface 500 can be displayed as a part of a service application (e.g., a user application) executing on the user device for use with the network-based service. The user can interact with the user application to preview the network-based service or to transmit a service request. In response to the session initiated for previewing the network-based service or in response to the service request transmitted to the network system, the network system can generate and transmit a verification request to the user device to cause the user device to display the verification user interface 500. The verification user interface 500 can include a camera viewfinder 510 that previews the view of a camera of the user device prior to capturing a plurality of images of the object being verified. The camera viewfinder 510 can include one or more visual guides 520. The user can align the object with the visual guides 522 trigger the user device to capture a plurality of images of the object. The verification user interface 500 can further include a capture soft selection 530 to trigger the device to capture the plurality of images of the object.

Referring to FIG. 5B, the verification user interface 550 can be displayed on the user device in response to a failure indication (e.g., fail 137 of FIG. 1) from the network system. For example, the user device can transmit verification data to the network system. And based on the verification data, never system can determine whether to deem the object verification process as having passed or failed. If the object verification process is determined to have failed, the network system can transmit the failure indication to the user device to cause user device to present the verification user interface 550 as part of the service application executing on the user device. The verification user interface 550 can include textual or visual indications that the object verification process has failed. The verification user interface 550 can also include a plurality of soft selection features using which the user can direct the next step in previewing or requesting the network-based service. By interacting with soft selection feature 560, the user can cause the user device to initiate contact with customer service of the network-based service. For example, in response to the user selection of soft selection feature 560, the user device can initiate a voice communication session (e.g., a telephone call) with the customer service of the network-based service. The user can also select soft selection feature 572 alter the payment method used in connection with the network-based service in order to resolve the object verification failure. In some instances, the user may be required to perform additional object verification after changing the payment method. Furthermore, the verification user interface 550 can include a soft selection feature 570 for cancelling the service request that triggered the object verification request from the network system. In response to the user selecting soft selection feature 570, the user device can transmit a cancellation to the network system and the network system can discard the user's service request. In addition, the service application executing on the user device can either terminate or return to an earlier state (e.g., default state when first executing the service application).

Hardware Diagrams

Figure 6:
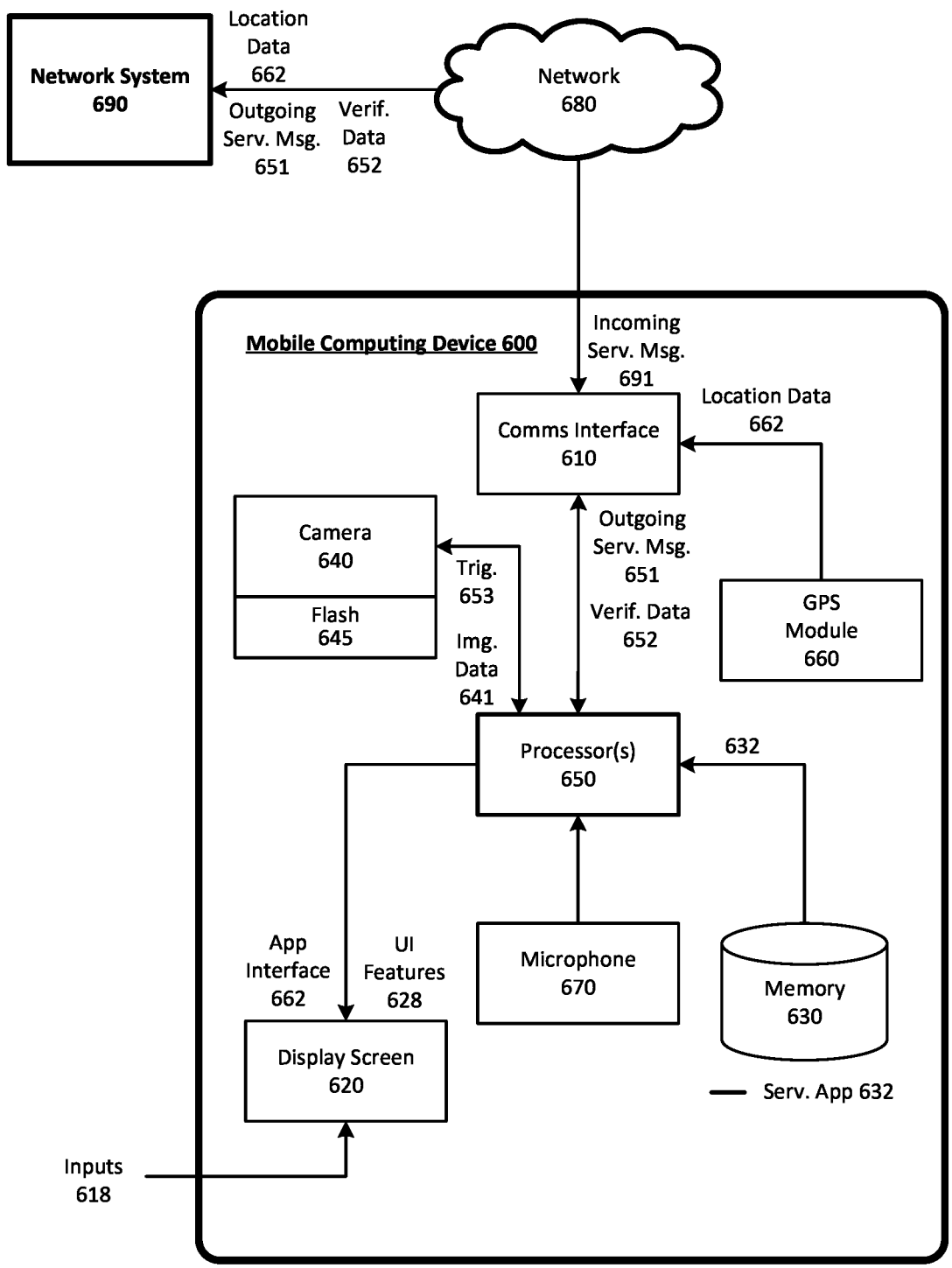
FIG. 6 is a block diagram illustrating an example mobile computing device, in accordance with examples described herein.

FIG. 6 is a block diagram illustrating an example mobile computing device, in accordance with examples described herein. In many implementations, the mobile computing device 600 can be a smartphone, tablet computer, laptop computer, VR or AR headset device, and the like. In the context of FIG. 1, the user device 180 and/or the provider device 190 may be implemented using a mobile computing device 600 as illustrated in and described with respect to FIG. 6. In addition, the mobile computing device 200 of FIG. 2 can be an embodiment of the mobile computing device 600 illustrated in FIG. 6.

According to embodiments, the mobile computing device 600 can include typical telephony features such as a microphone 670, a camera 640, and a communication interface 610 to communicate with external entities (e.g., network system 690 implementing the network-based service) using any number of wireless communication protocols. The mobile computing device 600 can store a designated application (e.g., a service application 632) in a local memory 630. The service application 632 can correspond to one or more user applications for implementations of the mobile computing device 600 as user devices for the network-based service. The service application 632 can also correspond to one or more provider applications for implementations of the mobile computing device 600 as provider devices for the network-based service.

In response to an input 618, the processor can execute the service application 632, which can cause an application interface 642 to be generated on a display screen 620 of the mobile computing device 600. In implementations of the mobile computing device 600 as user devices, the application interface 642 can enable a user to, for example, request for the network-based service. The request for service can be transmitted to the network system 690 as an outgoing service message 667.

In various examples, the mobile computing device 600 can include a GPS module 660, which can provide location data 662 indicating the current location of the mobile computing device 600 to the network system 690 over a network 680. In some implementations, other location-aware or geolocation resources such as GLONASS, Galileo, or BeiDou can be used instead of or in addition to the GPS module 660. The location data 662 can be used in generating a service request, in the context of the mobile computing device 600 operating as a user device. For instance, the user application can set the current location as indicated by the location data 662 as the default start location (e.g., a location where a selected service provider is to rendezvous with the user).

The camera 640 of the mobile computing device 600 can be coupled with a flash 645. The camera 640 can be used to perform one or more verification functions to verify that the user of the mobile computing device 600 has physical possession of one or more objects. The mobile computing device 600 can receive, from the network system, a verification request as an incoming service message 691. In response to the verification request, the user application can render a verification user interface to enable the user to take a plurality of photographs of the object to be verified. In particular, the user application can trigger the camera 640 and the flash 645 in response to one or more user actions (e.g., via a trigger signal 653 from the processor 650). For instance, in response to the user aligning the object with one or more visual guides in a camera viewfinder displayed on the screen 620, the user application and processor 650 can trigger the camera 640 to take multiple photographs of the object to be verified. The verification user interface can also display a "Capture Image" soft selection using which the user can cause the processor 650 to trigger the camera 640 to take photographs of the object to be verified. In capturing of the images of the object to be verified, the processor 650 can trigger the flash 645 such that at least one image of the object is captured with the flash 645 deactivated and at least one other image of the object is captured with the flash 645 activated. Captured image data 641 can be transmitted to the processor 650 for evaluation and processing. In certain implementations, the processors 650 can execute instructions of the service application 632 to process the captured image data 641 in software. In addition to or as an alternative, the processors 650 can include dedicated hardware (e.g., digital signal processors (DPSs), graphics processing units (GPUs), etc.) to process the captured image data 641 at least partly in hardware.

By evaluating and processing the captured image data 641, the processor 650 can generate verification data 652 to be transmitted to the network system 690. The network system 690 can determine, based on the verification data 652, whether the verification process has passed. The mobile computing device 600 can include encryption engines (not shown in FIG. 6) to encrypt any sensitive information in the verification data 652.

In response to receiving the verification data 652, the network system 690 can transmit a message to the mobile computing device 600 (e.g., as an incoming service message 691). If the message indicates that the verification process has passed (e.g., based on a determination by the network system 690), the service application 632 can allow the user to continue with requesting the network-based service (e.g., submit a service request, etc.). On the other hand, if the message indicates that the verification process is failed, the service application 632 can direct the user to perform one or more remedial actions in response to the failure of the verification process.

Figure 7:
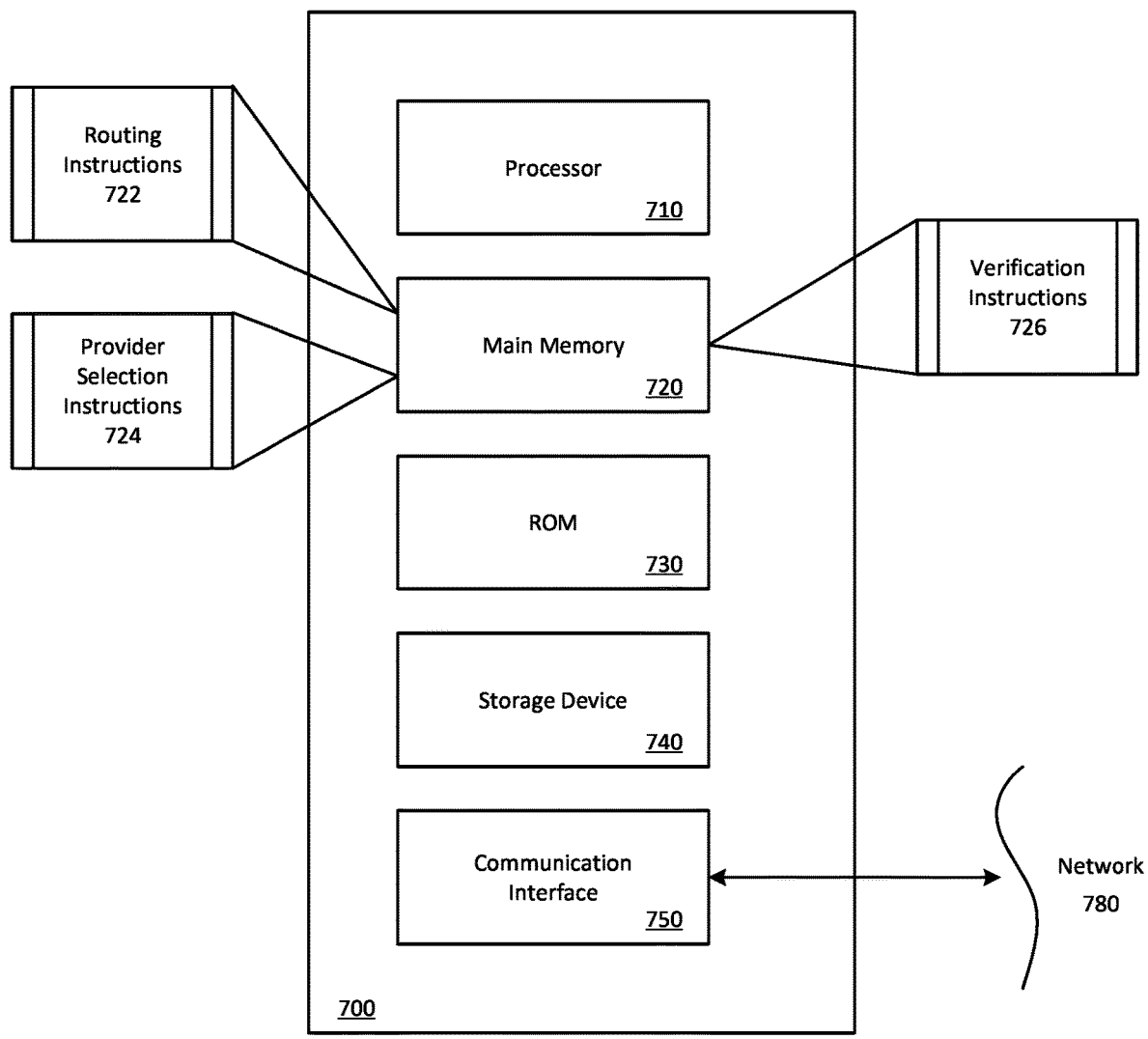
FIG. 7 is a block diagram that illustrates a computer system upon which examples described herein may be implemented.

FIG. 7 is a block diagram that illustrates a computer system upon which examples described herein may be implemented. A computer system 700 can represent, for example, hardware for a server or combination of servers that may be implemented as part of a network service for providing on-demand services. In the context of FIG. 1, the network system 100 may be implemented using a computer system 700 or combination of multiple computer systems 700 as described by FIG. 7. In addition, the network system 290 of FIG. 2 can be an embodiment of the computer system 700 illustrated in FIG. 7.

In one aspect, the computer system 700 includes processing resources (processor 710), a main memory 720, a memory 730, a storage device 740, and a communication interface 750. The computer system 700 includes at least one processor 710 for processing information stored in the main memory 720, such as provided by a random access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the memory 730 or other static storage device for storing static information and instructions for the processor 710. A storage device 740, such as a magnetic disk or optical disk, is provided for storing information and instructions.

The communication interface 750 enables the computer system 700 to communicate with one or more networks 780 (e.g., a cellular network) through use of a network link (wireless or wired). Using the network link, the computer system 700 can communicate with one or more computing devices, one or more servers, and/or one or more self-driving vehicles. In accordance with some examples, the computer system 700 receives service requests from mobile computing devices of individual users. The executable instructions stored in the memory 730 can include routing instructions 722, provider selection instructions 724, and verification instruction 726 to perform one or more of the methods described herein when executed.

By way of example, the instructions and data stored in the memory 720 can be executed by the processor 710 to implement an example network system 100 of FIG. 1. In performing the operations, the processor 710 can handle service requests and provider statuses and submit service invitations to facilitate fulfilling the service requests. The processor 710 executes instructions for the software and/or other logic to perform one or more processes, steps and other functions described with implementations, such as described by FIGS. 1 through 3E.

Examples described herein are related to the use of the computer system 700 for implementing the techniques described herein. According to one example, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A mobile computing device, comprising:
   a display;
   one or more cameras;
   one or more processors; and
   one or more memory resources storing instructions that, when executed by the one or more processors of the mobile computing device, cause the mobile computing device to:
   receive, over a network from a network system, a verification request for verifying an object;
   in response to receiving the verification request, present a verification user interface on the display of the mobile computing device;
   in response to detecting a user action while the verification user interface is presented on the display of the mobile computing device, capture, using the one or more cameras, a plurality of images of the object;
   generate verification data, including a first set of verification metrics, based on analyzing the plurality of images including determining the first set of verification metrics by analyzing a first image of the plurality of images captured while a flashlight of the mobile computing device is deactivated and a second image of the plurality of images captured while the flashlight of the mobile computing device is activated, wherein the first set of verification metrics is generated based on a light reflectivity of the object; and
   transmit the verification data over the network to the network system.

2. The mobile computing device of claim 1, wherein the executed instructions cause the mobile computing device to capture, using the one or more cameras, the plurality of images including the first image and the second image by automatically triggering activation of the flashlight of the mobile computing device prior to capturing the second image.

3. The mobile computing device of claim 1, wherein the executed instructions cause the mobile computing device to:
   present the verification user interface by presenting a viewfinder feature that includes one or more markers for aligning the object prior to capturing the plurality of images; and
   detect the user action while the verification user interface is presented by determining that the one or more markers are aligned with the object.

4. The mobile computing device of claim 1, wherein the executed instructions cause the mobile computing device to determine the first set of verification metrics by computing a light reflection radius of the object.

5. The mobile computing device of claim 1, wherein the executed instructions cause the mobile computing device to determine the first set of verification metrics by computing a brightness delta metric between the first image and the second image.

6. The mobile computing device of claim 5, wherein the executed instructions cause the mobile computing device to compute the brightness delta metric between the first image and the second image by computing a plurality of brightness deltas, wherein each of the plurality of brightness deltas is computed based on a comparison between a region of the first image and a corresponding region of the second image.

7. The mobile computing device of claim 1:
   wherein the verification data further includes a second set of verification metrics; and
   wherein the executed instructions cause the mobile computing device to generate the verification data by determining the second set of verification metrics by:
   analyzing the plurality of images to identify a plurality of features imprinted on the object;
   retrieving a template of features based, at least in part, on one of the plurality of features; and
   determining the second set of verification metrics by comparing at least some of the plurality of features with the retrieved template of features.

8. The mobile computing device of claim 1:
   wherein the verification data further includes a second set of verification metrics; and wherein the executed instructions cause the mobile computing device to generate the verification data by determining the second set of verification metrics by:
analyzing the plurality of images to identify a plurality of features imprinted on the object;
retrieving a user profile;
determining the second set of verification metrics by comparing at least some of the plurality of features with information stored in the user profile.

9. The mobile computing device of claim 1:
wherein the instructions further cause the mobile computing device to transmit, over the network to the network system, a service request for a network- based service; and
wherein the verification request is received by the mobile computing device in response to the service request transmitted to the network system.

10. The mobile computing device of claim 1:
wherein the object to be verified is a physical payment card; and
wherein information regarding the physical payment card is stored in a user profile of a user of the mobile computing device, the user profile being maintained by the network system.

11. The mobile computing device of claim 1, wherein the instructions further cause the mobile computing device to:
receive, over the network from the network system, an indication of verification failure, the indication of verification failure being received by the mobile computing device in response to transmitting the verification data to the network system; and
in response to receiving the verification data, present a user interface feature for performing one or more remedial actions.

12. A computer-implemented method, comprising:
receiving, by a mobile computing device operated by a user, a verification request for verifying an object, the verification request being transmitted by a network system;
in response to receiving the verification request, presenting a verification user interface on a display of the mobile computing device;
in response to detecting a user action while the verification user interface is presented on the display of the mobile computing device, capturing, using one or more cameras of the mobile computing device, a plurality of images of the object;
generating, by the mobile computing device, verification data, including a first set of verification metrics, based on analyzing the plurality of images including determining the first set of verification metrics by analyzing a first image of the plurality of images captured while a flashlight of the mobile computing device is deactivated and a second image of the plurality of images captured while the flashlight of the mobile computing device is activated, wherein the first set of verification metrics is representative of a light reflectivity of the object; and
transmitting, by the mobile computing device, the verification data over the network to the network system.

13. The computer-implemented method of claim 12, further comprising:
transmitting, by the mobile computing device, a service request for a network-based service;
in response to receiving the service request, determining, by the network system, either to proceed with processing the service request or to perform object verification, wherein the verification request is transmitted by the network system in response to determining to perform object verification; and
determine, by the network system based on the verification data, whether to proceed with the processing the service request or to transmit, to the mobile computing device, an indication of verification failure to cause the mobile computing device to present a user interface feature for performing one or more remedial actions.

14. A network system for managing a network-based service, comprising:
one or more processors; and
one or more memory resources storing instructions that, when executed by the one or more processors of the network system, cause the network system to:
receive, over a network from a mobile computing device of a user of the network-based service, a service request for the network-based service;
in response to receiving the network-based service, determine either to proceed with processing the service request or to perform object verification;
in response to determining to perform object verification, transmit, to the mobile computing device, a verification request;
receive, from the mobile computing device, verification data in response to the verification request, the verification data including a first set of verification metrics that is representative of a light reflectivity of an object to be verified; and
determine, based on the verification data, whether to proceed with processing the service request or to transmit, to the mobile computing device, an indication of verification failure to cause the mobile computing device to present a user interface feature for performing one or more remedial actions.

15. The network system of claim 14, wherein the first set of verification metrics is determined by computing a light reflection radius of the object.

16. The network system of claim 14, wherein the verification data further includes a second set of verification metrics that is generated by:
analyzing a plurality of images to identify a plurality of features imprinted on the object;
retrieving a user profile; and
determining the second set of verification metrics by comparing at least some of the plurality of features with information stored in the user profile.

17. The network system of claim 14:
wherein the object to be verified is a physical payment card; and
wherein information regarding the physical payment card is stored in a user profile of the user of the mobile computing device, the user profile being maintained by the network system.

* * * * *